United States Patent [19]

Narayan

[11] Patent Number: 5,418,957
[45] Date of Patent: May 23, 1995

[54] NETWORK DATA DICTIONARY

[76] Inventor: Rom Narayan, 20 Sedgemeadow Rd., Wayland, Mass. 01778

[21] Appl. No.: 849,103

[22] Filed: Mar. 9, 1992

[51] Int. Cl.6 .............................................. G06F 9/45
[52] U.S. Cl. .................................. 395/700; 395/600; 364/973; 364/975; 364/977.3; 364/DIG. 1; 364/DIG. 2
[58] Field of Search ................. 395/600, 700; 364/419

[56] References Cited

U.S. PATENT DOCUMENTS

| | | | |
|---|---|---|---|
| 4,742,467 | 5/1988 | Messerich et al. | 395/700 |
| 4,774,661 | 9/1988 | Kumpati | 395/600 |
| 4,791,561 | 12/1988 | Huber | 395/600 |
| 4,809,170 | 2/1989 | Leblang et al. | 395/700 |
| 4,819,160 | 3/1989 | Tanka et al. | 395/600 |
| 4,967,348 | 10/1990 | Naito et al. | 395/600 |
| 5,008,853 | 3/1991 | Bly et al. | 395/153 |
| 5,291,601 | 3/1994 | Sands | 395/700 |
| 5,317,511 | 5/1994 | Jacobson | 364/419.13 |

OTHER PUBLICATIONS

Christian, Kaare, *The Unix Operating System*, John Wiley & Sons, New York: 1983, pp. 62–73.

*Primary Examiner*—Thomas G. Black
*Assistant Examiner*—Larry J. Ellcessor

[57] ABSTRACT

The Network Data Dictionary is a device for enabling standardization of data structures in programs, file layouts and Data Base Management System (DBMS) schema residing in Include Files located on one or more computers in a network. By making the data structures comply with the data element definitions stored in a common data element dictionary, improvements in the quality, accuracy, and consistency of data can be obtained, while simultaneously providing productivity advantages to programmers. The device is set up to organize a set of disparate Include Files (representing data structure descriptions corresponding to program structures, file layouts, and DBMS schema), in one or more computers in a network under a common scheme called the Include File Dictionary, so that these Include Files are made accessible by the device to programmers for sharing, controlled modification, and use. The Include Files are enabled by the device so that programmers can edit these with reference to a common data element dictionary (DED) residing on one of the network nodes. Measurement of the extent to which Include Files correspond to dictionary standards are reported on compilation reports so that corrective actions (such as reconciling conflicting data element definitions) can be taken.

13 Claims, 5 Drawing Sheets

NETWORK DATA DICTIONARY

TECHNICAL FIELD

The present invention relates to management and administration of data definitions occurring in programs, file layouts and Data Base Management System (DBMS) schema in one or more computers in a network.

BACKGROUND OF THE INVENTION

Consistent and accurate information is of strategic importance to business. If programmers and users incorporate common data elements and structures in programs, files, reports, and databases, consistent and accurate information would be expected. However, despite dictionaries having been in existence for over 20 years, this result has not been achieved! Inconsistency of data from one system to the next continues to be a major problem confronting businesses. MIS managers will readily admit that the problem is caused by programmers not using a common dictionary when coding the data definition portion of their programs. Those who have tried, complain about the bureaucracy involved, the complexity, and finally the amount of time taken away from getting their job done. The lack of use of data dictionary by programmers can be directly attributed to the perception that the dictionary comes in the way of productivity. Most MIS managers wish the data problem would go away, but it only seems to gets worse, as more and more systems are developed without compliance to a single set of dictionary standards. Many MIS managers have been led to believe that they can get around the issue of implementing the dictionary by using CASE tools instead. Using CASE tools without a strong dictionary foundation only compounds the problem, because CASE tools have been used to implement single applications controlling their own files. Organization-wide data definition was the original problem that dictionaries were designed to solve, and CASE tools definitely do not solve the problem. This invention is a solution to this most vexing and long-lived problem confronting system development managers—to implement the dictionary so that it can address the problem of data incompatibility and data inconsistency while simultaneously providing productivity advantages to programmers.

The data dictionary is a tool for standardizing data elements and structures that exist or get created in programs, file layouts, and Data Base Management System (DBMS) schema. Dictionaries maintain information about data structures and their associated data elements in conceptual, logical, and physical models. The conceptual model depicts the data from a business or functional point of view. The logical model depicts the data from an application point of view. The transformation from the conceptual to the logical model takes into account the effects of allowing physical objects and relationships to be represented as information concepts. The physical model depicts the data in the form that is implemented in the program, file layout, or DBMS schema. The transformation from the logical model to the physical model is based on the capabilities of existing technology. Dictionaries initially supported physical models, specifically those required by the DBMS. As they have evolved to support the logical and conceptual models, the complexity of the dictionary has grown considerably.

Some success has been achieved in those installations using a DBMS or CASE tool exclusively, and having very strong data administration. But in most computer installations, system development has been and continues to be carried out in a laissez-faire mode, and data administration is not a significant force. Therefore, most programmers work in environments without a dictionary to support their day-to-day programming and maintenance activities. The reluctance to use existing DBMS-oriented dictionaries stems from the following design factors:

1. Dictionaries have been implemented as a control tool for the DBMS, oriented towards the administrator; this becomes a bottleneck inasmuch as it prevents programmers from using the dictionary directly in their day-to-day work without having to deal with the administrator.

2. Dictionaries use the DBMS (or a proprietary storage mechanism) to store their internal data. In order to get some benefit out of the dictionary, the programmer has to migrate all the existing data structure definitions from the familiar operating system directory/file structure into an unfamiliar scheme.

3. Dictionaries impose considerable administrative burden because of the implied top-down work flow model built into these. If, for some reason, the administrative resources are not applied, the dictionary's accuracy and integrity are quickly compromised, and programmers soon bypass the dictionary altogether.

4. The user interface in existing data dictionaries is complex and cumbersome and mirrors the complexity of the underlying dictionary schema. The user has to be knowledgeable about dictionary concepts (i.e. schema) as well as navigate through several layers of security built into the system. This prevents the average user from accessing and sharing the data in the dictionary in an intuitive and open manner.

Although Fourth Generation Languages and CASE tools have embedded data dictionaries, which are maintained by application of the methodology that comes with the tool, these dictionaries are designed for the specific tool, and maintain the metadata in proprietary structures resulting in some of the same problems outlined earlier. Data dictionaries are also associated with reverse engineering tools, which examine existing source code to come up with conceptual and logical data structures that can be used in future applications development. These dictionaries suffer from the implementation problems discussed earlier and also require considerable expertise and training to operate.

Repositories have recently been touted as a means to address the "data dictionary problem". The functioning of repositories is predicated on having the conceptual and logical models defined by the process of enterprise analysis. Additional complexity and administrative overhead is introduced by the fact that in addition to data models, process models and network configurations have to be maintained. Repository implementations contain the same deficiencies found in existing dictionaries, yet require the user to manage and integrate considerably larger amounts of information about data, process, and network over a life-cycle (configuration management).

Existing dictionaries unwittingly make it easier for the programmer to bypass the dictionary and create a new version of a data element definition than try to use the current version that exists in the dictionary. The net result is that dictionaries have been bypassed by programmers.

The technology paradigm that this invention operates under is quite different from existing dictionaries. It is based on the notion that the programmer should not have to adapt to the dictionary but that the dictionary should adapt to the programmer, tools and environment. The following methods are used:

1. Rendering an existing set of disparate Include Files across the network to this invention via links.

2. Providing hot key access to the data element definitions directly from the editing session.

3. Measurement of Include File compliance with dictionary standards via a dictionary compliance index.

4. Providing feedback to the programmer via reporting of data errors on compilation reports, cross-references to Include Files and programs.

5. Providing a data definition facility that uses data rules to assist programmers propose new data element definition.

This invention supports the way in which programmers code Include Files and use them in program development. It does so by utilizing the programmer's knowledge and experience at specific points in the day-to-day work in an incremental fashion, so that organizations can get their data structures under control without expending enormous resources. This product mimics operating system functionalities wherever possible, so that the programmer does not have to learn new methods. The programmer will find that the time required to learn to use the system is minimal. The feedback mechanism provides the programmer the means to be compliant with data standards in a self-controlling manner.

This invention reduces the bureaucratic burden by specifically providing the following benefits to programmers:

Reduce the time required to research the definition of a data item that appears in an existing Include File;

Take the drudgery away from having to figure out new data element definitions, names, sizes, and edit/validation rules;

Make all proposed data definitions widely visible to other programmers on the project and/or network, so that there is an assurance that no new data elements are being created independently or in a vacuum;

Allow the programmer to view, copy and modify an existing Include File; if the Include File is from a third party software package, ensure that a comparable standardized version is provided;

Allow access to data element definitions directly from the editing session, so that the time required to learn to use this facility is minimal.

The continued use of this invention should provide the following results:

1. A set of data element definitions that conform to the organization's naming conventions.

2. Programs, file structures, and database schema that incorporate common data definitions.

3. Tracking of relationships between programs and data elements.

4. Documentation of application systems.

5. Notification of proposed changes to data definitions.

SUMMARY OF THE INVENTION

The invention ensures that the data items in Include Files that are created by programmers working in different computers on a network accurately represent the information concept or object, are consistent with standards, and are easily accessible from the work setting. The Include Files referred to in this invention include data structure descriptions in programs, record layouts for a file, or a database schema description. The following specific objectives are also incorporated in the invention:

1. To enhance the programmer's productivity by re-engineering a set of data elements from existing Include Files;

2. To promote reusability of data structures and data element definitions.

3. To mesh with programmer work habits, so that the time required to learn to access information in the dictionary is minimal;

This invention addresses the need to provide a data dictionary facility that resolves the problems associated with contemporary dictionary implementation and use. The present invention discloses the process required to address the problems, as well as specific techniques used within the process.

During application program development and maintenance, Include Files consisting of data definition statements representing program data structures, file layouts, and DBMS schema, are routinely created and modified. These Include Files may exist in a single project directory, or in programmers' directories. The user enters the Include File Dictionary, and identifies the correct Include File by navigating through the directories that are in the Include File Dictionary. If it is a new Include File, then the user supplies a name and the language type as well as file type (if applicable). The user is positioned in the editor's buffer with the Include File. During the course of the edit session, the user can hot-key to the Data Element Dictionary, browse through data element definitions, retrieve and view the definition, and if applicable, apply the data element definition to the line in the edit buffer. If the definition desired by the user is not available in the Data Element Dictionary or the user requires changes made to the existing version in the Data Element Dictionary, a data element definition proposal can be made. The proposal itself can be applied to the buffer, subject, of course, to final approval from the administrator. At the conclusion of the edit session, the user audits the Include File to verify the compliance of the Include File content to the Data Element Dictionary. Based on the audit report, the user re-edits the Include File to and makes changes to the Include File based on the recommendations in the audit report. This is done by changing the affected data item line in the Include File and re-validating (cross-reference) the data item to the corresponding data element definition in the DED. The Include File is then ready for inclusion in the user's program for compilation and binding.

The process described above supports the way in which programmers code Include Files and use them in program development, by utilizing the programmer's knowledge and experience to obtain data element definitions incrementally. In this manner, the project team can get its data structures under control without expending enormous resources to do so. This device mimics operating system functionalities wherever possible so that the programmer does not have to learn new methods, and thus minimizes the learning curve. The feedback mechanism provides the programmer the means to be compliant with data standards in a self-controlling manner. Since all Include Files are widely visible to every programmer on the network, peer pressure will be exerted to keep the Include Files compliant with standards.

The device's primary user is the programmer. The administrator's input is required only when the system detects a change in an existing data element or the proposal of a new data element. The device will interface with existing system development methods and operational turnover procedures. These objectives are accomplished by the following:

1. Rules for data element definition are extracted from existing Include Files, and are allowed to expand with routine program development. By being responsive, programmers are encouraged to query the dictionary first before developing new definitions. If new definitions are needed, the dictionary makes it easy for the programmer to create the new definition in the context of the existing set of data elements. Thus, the process can begin with a relatively small starter set of data element definitions, which in turn grows with use. This implies that not all the data elements have to be defined for the dictionary to be gainfully deployed.

Thus an environment is established where conflicts over definitions can be resolved quickly, and the users of the dictionary are encouraged to contribute to its growth.

2. The Include File Dictionary uses the familiar hierarchical tree-like directory structure to contain the Include Files. FIG. 3 shows how the IFD structure maps to the existing directory structure across a network. The IFD has an anchor directory as a basic requirement. From this anchor directory, links are established to directories of persons or project teams that need to share Include Files. The commands used to navigate these Include Files are similar to operating system directory/file commands. Programmers are able to read and copy Include Files from any other directory, but they can only update the Include Files within their own directory.

Production versions of Include Files are maintained in a directory with the production flag set. Include Files can be "checked out"0 from production directories with the express intention of making modifications and checking them back in at a later time. The Include Files that are "checked out" cannot be checked out by another user, however, the production Include File can be "copied" by another user.

3. The programmer utilizes an editor (such as EMACS), that is linked to the Data Element Dictionary over the network to make standards available to the programmer whenever a reference to the DED is required during the course of the editing session. Thus dictionary resources are brought to bear only when needed.

4. Programmers have the ability to browse the logical data groups that are developed from combining data elements, and generate file structures directly from these data groupings. This helps programmers develop preliminary file layouts quickly during the system specification and prototyping phases.

The present invention discloses the following features and associated techniques used:

Include File Dictionary: Organization of the Include Files in various directories in the network into the Include File Dictionary, such that access to all Include Files in the network is enabled. This consists of establishing the anchor directory, and creating links to existing Include File directories in the network that are to be brought into the PURVIEW of the IFD. Privileges on the directories are set to the appropriate user/usage level. This allows programmers to view and copy any Include File in the IFD. They can edit the Include Files in the directory to which they have update access. Alternatively, they can create new Include Files. All the operations on Include Files within the IFD mimic the equivalent operating system command syntax.

Context sensitive editor: Once the Include File that is to be edited, validated or generated is identified in the IFD, it can be edited. When the editor is invoked, it loads the context dispatcher program in memory, which provides the remote connection to the Data Element Dictionary. The edit buffer is then loaded with a copy of the Include File for editing. This allows programmers use of all the normal functionality of the editor, and whenever desired, they can hot-key to the context dispatcher. The context dispatcher examines the current line in the edit buffer from which the user hot-keyed, and makes the appropriate remote calls to the DED for data from the DED in support of the operation requested.

The relationship between the data item in the Include File and the corresponding data element in the DED is maintained in the IFD. This forms the basis for the measurement of compliance. If an item is entered into the Include File that has no correspondence to the DED, then it is not considered to be validated. Comment lines and other lines of syntax that do not correspond to data items are ignored.

Audit: This function provides programmers with immediate feedback on whether their Include Files conform to the standard defined in the DED, thus encouraging a higher degree of conformance; these measurements are also displayed on the compilation report, so that incentives are built in for sustained and consistent use of the dictionary.

The quality level of an Include File is indicated by the dictionary compliance percent score. This information is available to all users of the dictionary system, thus exerting peer pressure on programmers to keep the compliance score high. It becomes a focal point for communicating standards, because discrepancies are forced to surface, and conflicts have to be resolved in order to continue. The audit report is used in the following ways:

As feedback to the individual programmer on an Include File's compliance, with appropriate suggestions to bring it under compliance;

As feedback to the project manager of the average compliance of all the Include Files used within a system, so that the Project or System Development Manager can set certain goals;

As feedback to the Data Administrator on the average compliance of all the Include Files, so that improvements in the compliance level can be achieved across the board.

[Note that the compliance score takes into account older systems (grandfathered) and third party systems.]

Data element definition: Whenever a programmer queries the DED and is unable to find the data element that he or she is seeking, the programmer has the option of proposing a new data element. Assistance to the programmer is provided by the system in defining the data element defaults viz. naming conventions, abbreviations, data type, size, screen and report formats, ranged language representation. The defaults can be overridden by the programmer, if desired, subject to final approval by the administrator.

Data item validation: This process is automatically carried out if the line in the edit buffer contains a full or partial data item representation. Data item validation consists of:

a) Parsing mnemonics, and resolving them into words that are positioned into a name sequence comprising a prime word, qualifiers (optional), class word, and class word modifier (optional).

b) If any new words are identified, obtaining the standard abbreviation if the current abbreviation is not a standard.

c) For those words that are prime words, obtaining the logical data group that the prime word corresponds to, and also the description of the prime word.

d) For those words that are class words, obtaining the rules for language representation and definition defaults;

By obtaining missing information during the process of editing or validation, the experience of the programmer is brought to bear in further defining the data element at the time closest to its use in an Include File. A message is simultaneously sent to the administrator indicating that a new data element has been proposed or changes to an existing data element are suggested. The administrator can review the proposal for conformance with corporate standards and make it available as a standard to all users in the network.

Change management: As business needs change, corresponding changes need to be made to data element definitions and structures which in turn could affect various Include Files, programs, and data structures. The impact of a change to a data element has to be analyzed in order to ensure that corresponding changes are made to all affected Include Files, programs, and data structures.

As mentioned earlier, the administrator is notified of proposed data definitions and change requests which are transmitted through the messaging system. By using the dictionary's impact analysis feature, the administrator is able to quickly respond to changes proposed, and provide a comprehensive statement of impact to the proposer. If there is a conflict, the administrator can bring the affected parties to a quick resolution of the conflict, before incorrect definitions have been incorporated into a large number of programs. The programmer benefits from the fact that he or she can continue to do their work, whereas the administrator is assured of the opportunity to verify the integrity of the data element definition with existing standards.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT OF THE INVENTION

Figure 1:
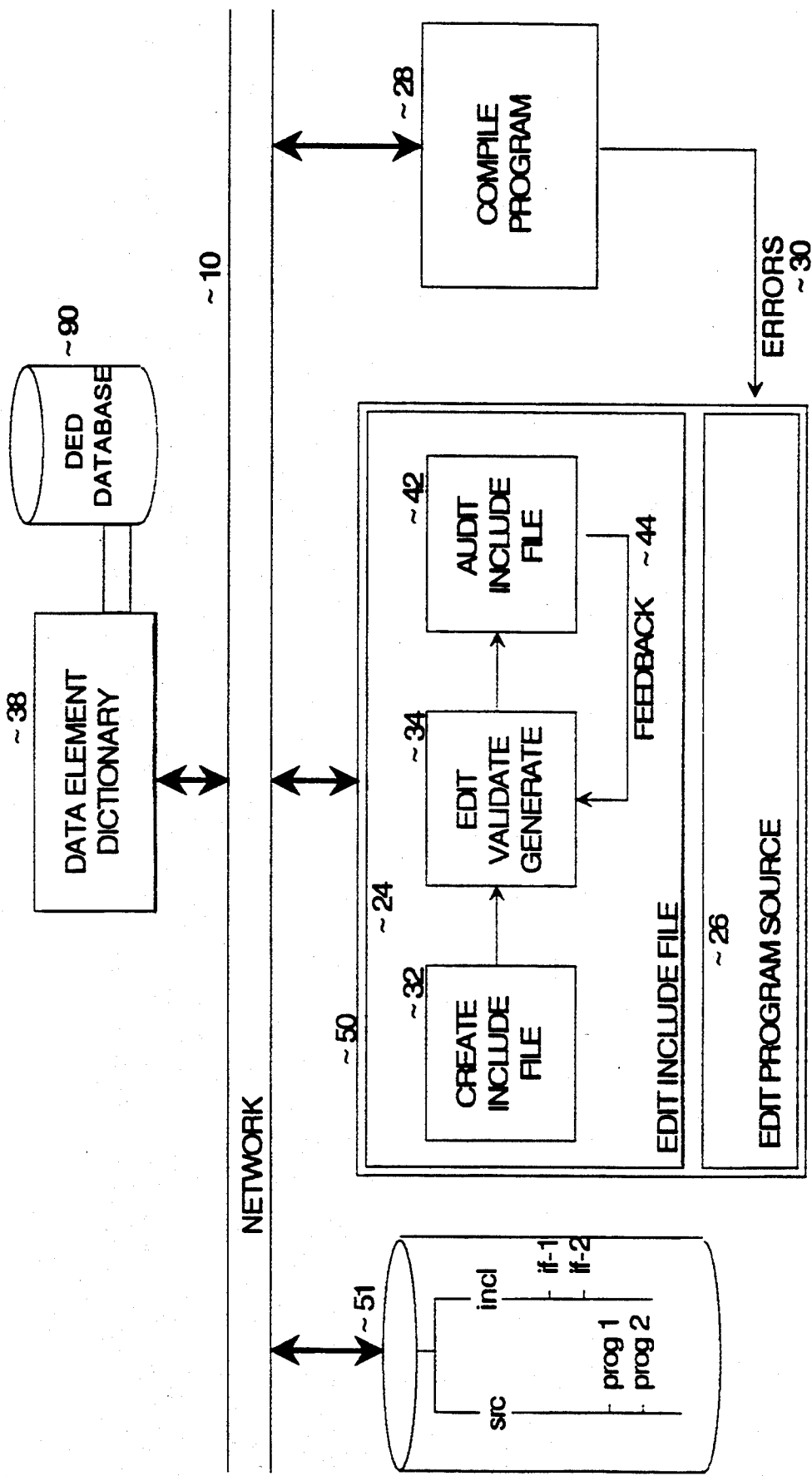
FIG. 1 is a schematic of the Network Data Dictionary process used in the present invention.

The invention fits into the program development process, illustrated in FIG. 1. Overall, the iterative steps involved in program development and maintenance consists of program specifications leading to Include File editing 24, source program editing 26, compiling 28, and error correction 30. This invention assists in the Include File editing step 24. Within the Include File editing subprocess, the first step consists of invoking the Include File Dictionary, and identifying the correct Include File 32. If it is a new Include File, then the user supplies a name and the language type as well as file type (if applicable). The user is positioned in the editor's buffer with the Include File to do editing 34. If the programmer needs assistance from the Data Element Dictionary 38 while editing a particular Include File line, the user hot-keys to the dictionary, browses through data element definitions, retrieves and views the definition, and if applicable, applies the data element definition to the line in the edit buffer 36. If the definition desired by the programmer is not available in the Data Element Dictionary or the programmer requires changes made to the existing version in the Data Element Dictionary, then the programmer makes a proposal 40, and continues the edit session by applying the proposed definition. The programmer then audits 42 the Include File to verify the compliance of the Include File content to the Data Element Dictionary. Based on feedback in the audit report 44, the programmer edits the Include File 34 to more accurately reflect the standard in the DED 38, or, if the data item in the Include File cannot be changed, validate (cross-reference) the data item to the corresponding data element definition in the DED. The Include File is then ready for inclusion in the program for compilation and binding.

Figure 2:
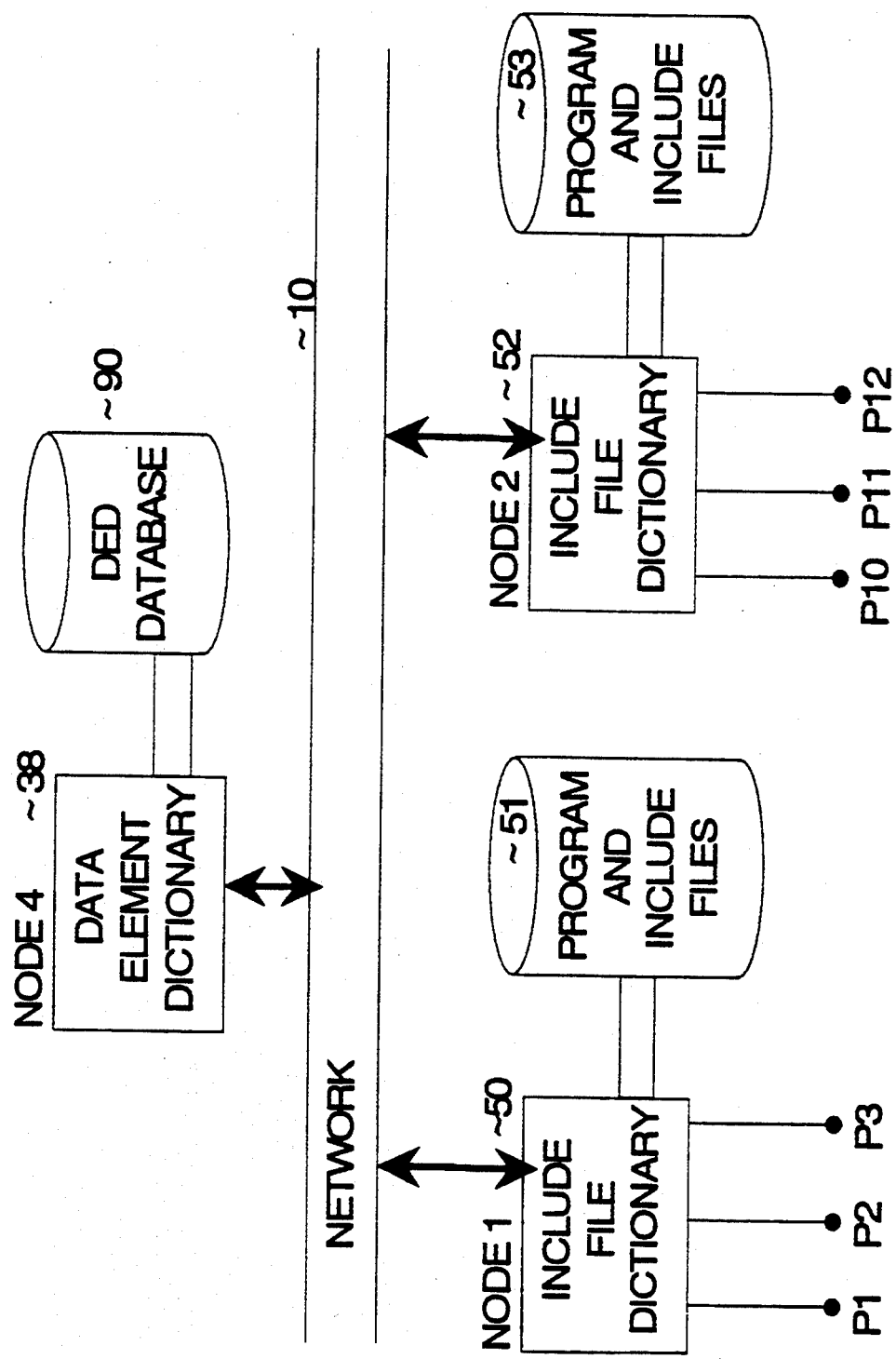
FIG. 2 is a block diagram illustrating the Network Data Dictionary components operating in different nodes of the network.

The present invention can be implemented on a set of computers (single-or multi-user) connected together in a network via servers, and may, for example, be implemented on an XA2000 fault tolerant set of computers from Stratus Computer Inc. connected in a network. In FIG. 2, NODE1 50 refers to a node with its own copy of the VOS operating system, attached to disk 51. Note that the disk is accessible from other nodes, i.e. NODE2, NODE3 etc. The nodes are connected to each other via Stratalink 10, a proprietary Local Area Network connecting the XA2000s. Programmers P1, P2, P3 and so on, logged into NODE1 can access IFD editing services on NODE1 which in turn accesses the DED 38 which is located on another node, NODE4. Programmers P10, P11, P12 and so on located on NODE2 can access IFD editing services on NODE2 which in turn accesses the DED 38 on NODE4.

Figure 3:
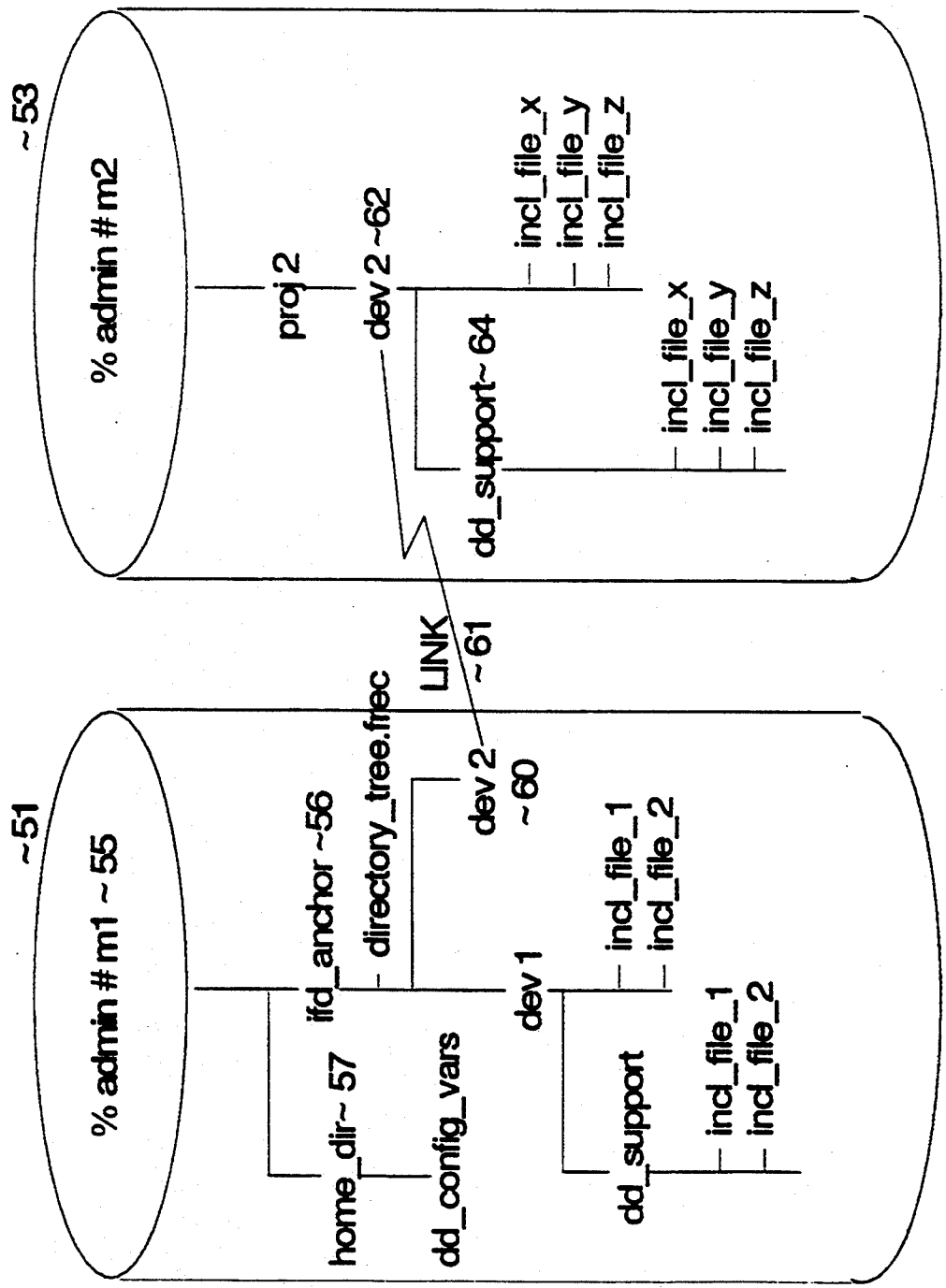
FIG. 3 is a schematic of the Include File directory structure used in the present invention.

An illustration of the Include File environment is given in FIG. 3. Consider a scenario where there are two related project teams, each team on a different node, NODE1 and NODE2. Each node has its own set of Include Files stored in an operating system directory structure starting at the root identified by the disk identifier, for example, % dmin#m1 55 and % admin#m2. Assume that NODE1 50 is selected to contain the anchor directory for the common Include File Dictionary structure. The anchor directory called ifd_anchor 56 is created below the root directory or accepted based on the specification in the configuration file located below the home directory of the administrator called home_dir 57. The configuration file, named dd_config_vars is a text file which can be edited by the user using any text editor, including EMACS. A 'dd_config_vars' file exists for each user logged into the IFD. A sample 'dd_config_vars' file is shown below, followed by an explanation of the various lines.

IFD: % nsc#m1_d01>ifd_anchor ifd1.hist Executibles_Dir_path: % nsc#m1_d01>pm DED_Server_path: % nsc#m1_d01>dd_server_queue EMACS_startup_arguments: -backup -keystrokes -debug -start_up_path % nsc#ml d01>home_dir>d-d_start_up.emacs IFD: This is the pathname of the IFD anchor directory. Optionally, a history file name for the IFD can be specified on this line (the example shows 'ifd1.hist'). If a history file name is not specified, the system will automatically supply one. Additional IFD names are automatically added when another IFD is accessed. Note that the system automatically defaults to the first IFD it finds.

Executibles_Dir_path: This is the pathname of the directory where the dictionary's executable programs reside. The programs have the suffix .pm attached to them.

DED_Server_path: This is the pathname of the queue file for the DED Server. This serves as the message/communication file between the various programs that need to access the DED.

EMACS_startup_arguments: This is the list of startup arguments that the user wishes for the EMACS session. A 'start_up_path' name for additional parameters that you need to specify in order for the EMACS to work properly must be included.

A sample EMACS_startup_file is shown below. The literal "set_key" is followed by the keystroke(s) and the equivalent word mnemonic. Note that all keys can be tailored to individual user preferences, including the key that will be used as the hot-key to access the DED.

```
/* Sets <GOTO>-<arrow> as start/end of line/screen
set_key ^-^ f end_of_line
set_key ^-^ b beginning_of_line
set_key ^-^ n end_of_screen
set_key ^-^ p beginning_of_screen
/* Sets <SHIFT-GOTO>-<SHIFT-arrow> as start/end of buffer
set_key esc-[-H-esc-n end_of_buffer
set_key esc-[-H-esc-p beginning_of_buffer
/* Sets <CE>-<DEL> / <CE>-<BACKSPACE> as delete word/delete word back
set_key ^ x-DEL delete_word_forward
set_key ^ x- ^ h delete_word_backward
/* sets <CE>-< → > / <CE>-< ← > as delete to end/start of line
set_key ^x- ^b kill_left
set_key ^x- ^f kill_right
/* Sets <CE>-<SPACEBAR> as delete spaces
set_key ^ x-SP delete_blanks
/* Sets <LINE FEED> as delete line
set_key ^ j delete_line
/* To replace pre-empted combinations:
/* Sets <CE>-<L> as list buffers, and . . .
set_key ^ x-l list_buffers
/* . . . Sets <CE>-<F> as find_file
set_key ^ x-f find_file
/* . . . Sets ^x- ^l as login_process
set_key ^x- ^l login_process
/* STRATUS DATA DICTIONARY KEYS
/* . . . Loads and initilizes the context dispatcher
load_cd
/* . . . Sets <CTRL-a><CTRL-a> to go to beginning of line
set_key ^a- ^a beginning_of_line
/* . . . Sets F5 to execute the context_dispatcher (hot-key)
set_key ^a-E-cr exec_cd
/* . . . Sets F10 to quit xemacs
set_key ^a-J-cr quit
```

Below the anchor directory in the IFD, a file called "directory_tree.frec" 58 is established that contains the description of the directory structure covered by the Include File Dictionary. Other subdirectories can be created by users who are given privileges by the administrator.

The target directories containing the Include Files in the various nodes are rendered to one Include File Dictionary by linking these directories to the anchor directory. The act of rendering the target directories causes the following to happen:

1. For a target directory such as % admin#m2->proj2>dev2 62 that is rendered, a physical operating system directory called dev2 60 is created under the anchor directory ifd_anchor 56;

2. A physical operating system link 61 is established between the directory dev2 60 and the target directory % admin#m2>proj2>dev2 62;

3. A record describing this link is established in the "directory_tree.frec" file 58;

4. A sub-directory called "dd_support" 64 is created under the target directory % admin#m2>proj2>dev2 62 to maintain additional information pertaining to each Include File;

5. Additional access rights are automatically set, so that the target directory is available to all users of the Include File Dictionary to view and copy. Update access to the directory can be given to individuals or groups at this time by the administrator.

As mentioned earlier the directory_tree.frec file 58 maintains the current directory structure of the IFD. This files is updated whenever there is a change to the directory structure. There is also a local project manager list file called pm_list.frec 59 containing the valid project manager usernames. This file is compared to the login username to determine if the user is a project manager. The directory_tree.frec file 58 is comprised of an array of directory tree records. The directory tree records contain:

Directory—path from anchor to directory

Class flag—flag indicating whether directory production, development, reference, test, or archive Leaf—flag indicating whether directory is a leaf Link—flag indicating whether directory is a link to an external directory Project manager name—user name of project manager with write access to Include Files under this directory Username—username of programmer with write access to Include Files within directory When the user logs into the IFD, the program checks the configuration file to ensure that the correct anchor directory is accessed. Additionally, a history file is maintained that keeps track of the most recently accessed files and directories.

Figure 4:
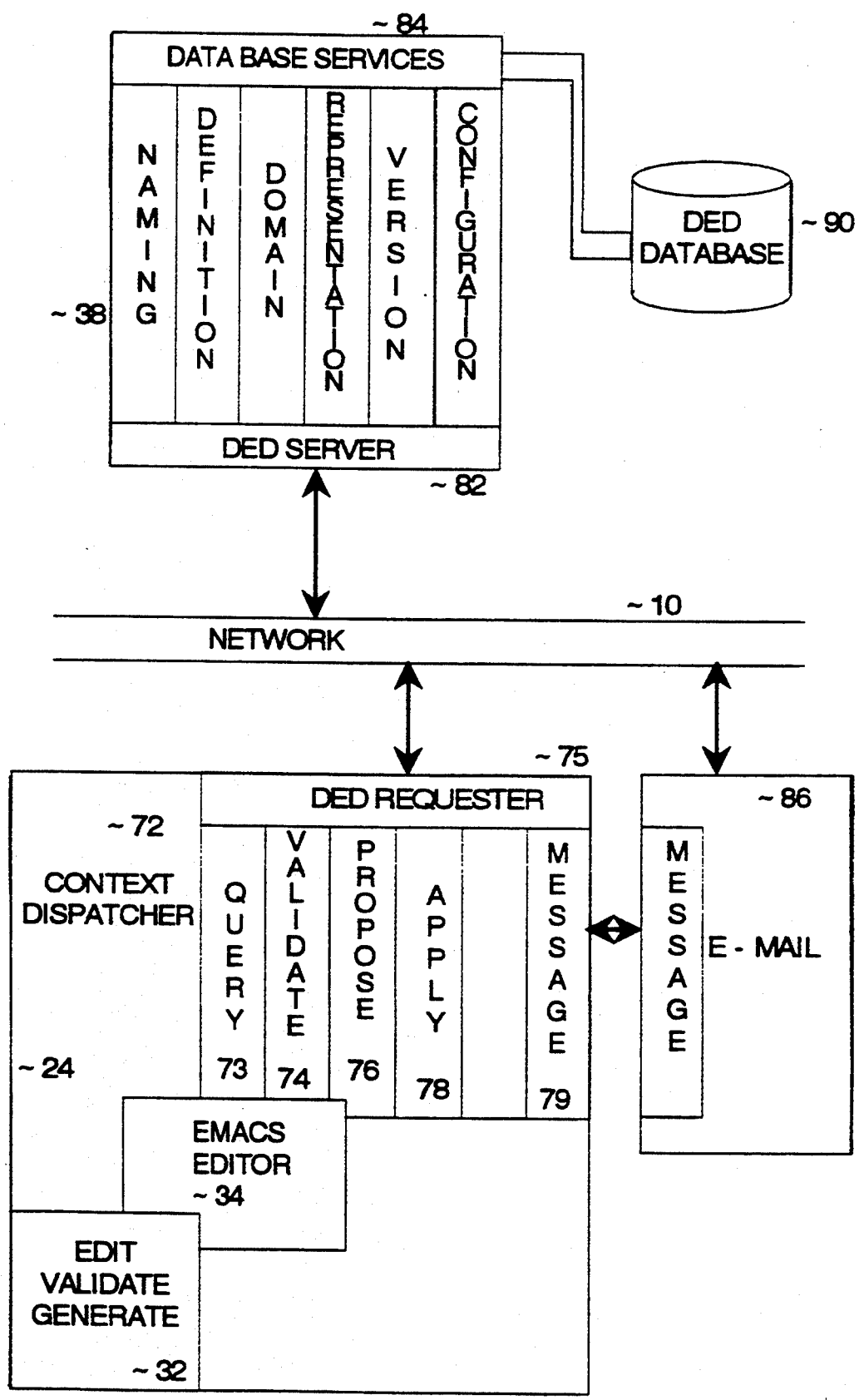
FIG. 4 is a diagram illustrating the different functions within the Include File Dictionary (IFD) and the Data Element Dictionary (DED).

The user now has access to the Include Files that have been rendered by the steps mentioned above. The user can perform normal operating system operations upon this set of Include Files such as copy, delete, rename, display, print etc. As shown in FIG. 4, if the user has update access, the following additional operations can be performed, i.e. edit, validate, and generate 32. These operations are performed using a version of the EMACS editor 34 that provides context-sensitivity to the Data Element Dictionary 38. The EMACS is passed a copy of the actual Include File and support file (both of these would be locked for the duration of the session) with system supplied temporary file names.

The EMACS program 34 is a subordinate process to the main IFD process, that loads the context dispatcher program 72 in memory. The context dispatcher program 72 has access to a subset of EMACS internal text handling functions as well as the text buffers. When the user hot-keys to the context dispatcher, a context file is established with the appropriate context (edit, validate, generate) and the pathnames to the temporary copies of the Include File and support file, thus allowing the context dispatcher to copy, delete, and insert text for the EMACS process. As part of the process of making the DED available to the user from the EMACS session, the context dispatcher tests the network 10 by trying to access the DED database 90. The handshake routines consists of two accesses to the database to get the database administrator name and the pathname to the directory containing long descriptions of data elements. If it fails to access the database for any reason including network failure, the user is notified of this fact, and allowed to continue to edit the Include File but without the hot-key functionality.

When the target Include File that is to be edited, validated, or generated, is identified, a support file with the same name as the Include File name is created under the "dd_support" directory. The support file has the following information:

Header information
Author—username of creator of Include File
Creation date—date/time of creation
Brief description—short description of Include File
Related DB/File—name of related data base or file
DB/File type—technology maintaining database or file
Language—(C, COBOL, PL1, SQL)
Prefix—name of prefix used in Include File
Suffix—name of suffix used in Include File
Record name—name of record/structure in Include File
Changed by—username of last one to change file
Change reason—reason for last modification
Change date—date/time of last modification
Change count—number of times modified
Turnover date—date/time of production turnover
Checker out—username of person who has checked file out of production library
Checkout date—date/time of checkout
Archive date—date/time archived Data item list records
Item tag—name used in Include File Item representation—Local Include File representation Data element name—name of data element in DED that this item tag corresponds to Version—version number of data element in DED Standard representation—DED representation corresponding to data element Standard indicator—represents whether the data element in DED has been standardized by the administrator Conformance indicator—switch indicating required level of conformance, i.e. grandfathered (G), mandatory (M), Exempt (E), Change required (R).

Program cross-reference list records
Program name—name of program using Include File
Compile date—date of last compilation The Data Element Dictionary 38 exists on one of the nodes of the network 10, and is a shared resource. The Data Element Dictionary is implemented as a server, so that several IFDs situated on the network can be supported by one DED.

Let us now trace the path of a request from the EMACS editing session 34 to the DED 38. As mentioned earlier, the user hot-keys to the context dispatcher while positioned at a line in the Include File which is being edited. The line may be empty, partially filled out, or completely filled out with a data item representation corresponding to the language of the Include File (i.e. COBOL, PL1, C, SQL).

When the user hot-keys to the context dispatcher 72, the following functions are invoked:

1. terminal_modes_changed: The terminal modes have to be changed from EMACS to the screen handler used for the context dispatcher; upon termination of the context dispatcher, the reverse occurs.

2. screen_changed: The screen parameters have to be changed from EMACS to the screen handler used for the context dispatcher; upon termination of the context dispatcher, the reverse occurs.

3. get_buffer_file: This function gets the buffer file, so that operations described below can be performed on it.

4. get_line: This function gets the current line in the EMACS buffer.

5. replace_line: This function replaces the current line with the line provided by the context dispatcher.

6. insert_line: This function inserts the line provided by the context dispatcher in front of the current line.

The line that is sent to the context dispatcher 72 is subject to the validation process 74 in order to decode the intent of the programmer, and narrow down the number of possible data element definition choices that are presented. The input line is parsed into Data Element Prefix, Data Element Standard Mnemonic, and Data Element Representation. If the Mnemonic is missing, a DED query 73 is initiated to get a representation which the user may optionally apply to the Include File. If the mnemonic is unknown, the representation is fetched from the DED using its abbreviations for the user to apply 78. If the representation is grandfathered, or does not meet the standard, the user may still apply the standard. If he or she elects not to, or if the representation does not meet the standard, he or she may initiate another DED Query 73 to get a different representation to apply, and/or send a message 79 to the administrator.

The following illustrates what happens when the programmer enters the following line in the EMACS buffer and presses the hot-key:

05 CST-NAME

The context dispatcher 72 invokes the validation process 74 which parses the 'CST' and 'NAME'; it checks the list of valid mnemonics to come up with the corresponding keyword; for example, in cases where one mnemonic may point to more than one keyword, it will ask the user to point distinguish the two. In the above example, it would ask the programmer to distinguish whether 'CST' refers to 'COST' or 'CUSTOMER'. All accesses to the DED are routed via the DED requester 75. The DED requester transmits the request across the network to the DED server 82 which accesses the DED database 90 via calls to DB Services 84 to return the appropriate information to the requester, which is passed to the appropriate part of the context dispatcher. Let's assume the programmer intended 'CST' to refer to 'CUSTOMER'; the tokens 'CUSTOMER' and 'NAME' are passed to the query process which will return the following data element definition choices (if they exist in the DED):

CUSTOMER NAME
CUSTOMER BILL TO NAME
CUSTOMER SHIP TO NAME

If the programmer chooses 'CUSTOMER NAME', the context dispatcher will pass the new line to EMACS and terminate. The original partial line in the EMACS buffer will be replaced by the following:

05 CUST-NAME PIC X(35).

In the background, a data item list record is stored in the support file corresponding to the Include File. The record contains the cross-reference between the data item in the Include File and the corresponding data element in the DED.

While in the context dispatcher, if the programmer is unable to find the appropriate data element, he or she could call up a data definition screen and propose a new data element 76, and use it in the Include File. The data element proposal alerts the administrator via a message sent through the organization's electronic mail system 86. The administrator ensures that the proposal meets the organization's standards.

The data element proposal is an important aspect of the system, because in current dictionary implementations, data elements can only be entered by the administrator, thus lengthening the time it takes for a new data element definition to be recognized by the dictionary. In this invention, the proposal process enables the programmer to specify and use a new data element definition without the intervention of the administrator. This is because the programmer simply follows the data element definition rules. These rules have a well defined format which guides the programmer based on the defaults that have already been entered into the system initially by the administrator. However, if a default such as a mnemonic for a keyword has not been already been provided, the system prompts the programmer to provide the default and continue.

Shown below are the rules that are built into the invention. The defaults can be updated by the administrator acting independently or in response to messages from users. The rules and defaults accommodate new technologies and methodologies.

Naming convention
Prime words and logical data groups
Class words
Default attributes
Language representation rules
Abbreviations Naming convention used in the invention: A consistent name generation procedure is utilized by the Data Element Dictionary. The automatic generation of names and other characteristics ensures that there is consistency in the data element standards that are developed from the dictionary. The taxonomy of a data element name is the following:

| 1. one prime word (or combination) | mandatory |
| 2. One or more qualifying words | optional |
| 3. One class word | mandatory |
| 4. One modifying word for the class | optional |

Prime words and logical data groups: Examples of prime words are vendor, customer, employee, engineering change order etc. and they correspond to logical data groups (also referred to as entities). Data elements are proposed under the appropriate logical data group by using the appropriate prime word. Examples of prime words and the corresponding logical data groups are shown below:

| Prime Word | Logical Data Group |
|---|---|
| account | account |
| bank | financial institution |
| check | check |
| contact | contact |
| contract | service contract |
| customer | client |
| employee | employee associate |

Logical Data Groups (or entities) are things of significance about which information needs to be known. They are generally mutually exclusive and are composed of groups of data elements such as customer, employee, vendor, part, drawing, and so on. These groups are identified through the process of systems and data planning, and entered into the Data Element Dictionary by the administrator or the programmer as part of a data element proposal. Logical data groups have a uniquely identifying key, contain data elements that are single valued (i.e. customer name), as well as elements that are multi-valued (i.e. color of car). Programmers and analysts are encouraged to enter information about Logical Data Groups, since they would have first-hand knowledge of such groups at the time of data element definition. For each Logical Data Group, header information as well as a list of data elements that belong to that Logical Data Group are maintained.

Examples of class words are number, amount, code, constant, count, date, name, percent etc. A class of data elements has common attributes referred to as its domain.

Class words: Class words represent the groupings of data by type of data, that is, different data elements belonging to the same class share certain physical attributes, such as size, datatype (alphanumeric, numeric, etc.), storage representation, validation rule, range, etc. Sample class words are address, amount, name, number, code, percent, cost, count, price, date, quantity, description etc.

Class words and the data rules and defaults for each class word are described below. Based on the class word associated with a data element, the following defaults are automatically assigned:

Class code: In most cases, the class word and the class code are the same. In some cases, it is likely that different class words are used within the organization, but they correspond to the same class code. For example, cost and price refer to monetary amount. In order to provide the ability to create names that are relevant to the organization, different class words corresponding to the same class code could be defined.

Data types are selected from one of the types described below:

Alphabetic—the data element can contain letters of the alphabet and/or spaces; maximum size is 32767; and unit of size is bytes.

Alphanumeric—the data element can contain letters of the alphabet and/or numeric characters and/or spaces; maximum size is 32767; and unit of size is bytes.

Binary—the data element can contain a binary number; maximum value of size is 18 or 18.0; and unit of size relates to the decimal digits in the decimal equivalent of the maximum number the data element can hold.

Bits—the data element can contain a bit string; maximum size is 4096; and unit of size is bits.

Character—the data element can contain any printable and/or non-printable characters; maximum size is 32767; and unit of size is bytes.

Packed-decimal—the data element can contain a packed decimal number (relevant to COBOL COMPUTATIONAL-3 or PL/I DECIMAL FIXED); maximum size is 18 or 18.0; and unit of size is decimal digits.

Floating-point—the data element can contain exponent and mantissa; maximum size is 16; and unit of size is decimal digits in the mantissa.

Hexadecimal—the data element can contain a hexadecimal string; maximum value is 16; unit of size is hexadecimal characters.

Numeric-character—the data element can contain numeric characters (hexadecimal F0 to F9); maximum size is 18 or 18.0; unit of size is decimal digits.

Note that depending on whether the data type selected is alphanumeric or numeric, certain other specifications are required, for instance, precision, scale, sign, rounding, justification, and character varying.

Size: The size corresponding to the reasonable expectations for the data element. It is better not to oversize, because this wastes disk storage. This value is used in generating the language representation.

Size type: The unit of size corresponding to the data element i.e bit, byte, word.

Precision: S for single, D for double precision.

Scale: A number to designate the number of decimal places.

Sign: Y for signed, N for not signed.

Rounding: Y if rounding is effective, N if rounding is not.

Justification: L for left, R for right justification.

Character varying: Y for character varying, N for fixed.

Screen format: The default format is entered that is the value of this data element as it would appear on the screen. The rules for defining the screen format are given below:

Edit strings are constructed using the following rules that are generally accepted in the industry:

| | |
|---|---|
| X | — any character |
| T | — any text character |
| 9 | — numeric character |
| . | — insert a period |
| , | — insert a comma |
| D | — day; |
| M | — month; |
| Y | — year; |
| H | — hour; |
| P | — minute; |
| N | — month nbr.; |
| Q | — second; |
| W | — day of week; |
| % | — AM/PM character; |
| * | — fraction of second |
| F | — hexadecimal digit char. |
| 7 | — octal digit character |
| 9 | — decimal digit character |
| C | — encoded minus; |
| K | — encoded plus |
| G | — encoded sign |
| E | — exponent character |
| − | — floating minus |
| + | — floating plus |
| $ | — floating currency |
| | — floating blank |
| " | — edit string literal character |
| B | — logical character (TRUE/FALSE) |
| L | — lowercase representation |
| (0) | — minus parenthesis character |
| ? | — missing separator character |
| x(n) | — repeat count character |
| U | — uppercase character |

Report format: The default format is entered as the value of this data element as it would appear on a report. The rules for defining the report format are the same as those for screen format.

Default value: The default value for this data class, if no value is provided by the user at the terminal session.

Occurs: The occurrences of this data element (relevant to the COBOL occurs clause). Typically this is 1.

Range high: Highest value that this data element could take.

Range low: Lowest value that this data element could take.

Language representation codes: The language representation code is the template that is used to create the language representation for COBOL, C, PL1, and SQL. The template contains two variable names NAME and SIZE. When the language representation is created, NAME is replaced by the data element language mnemonic, and SIZE is replaced with the value of the size for the data element. All other information entered on the template is kept in place. Thus a COBOL representation code like:

05 NAME pic x(SIZE).

will result in the following representation for the data element customer name (language mnemonic: cust_name), with a size of 35 bytes:

05 cust_name pic x(35).

Since certain languages are position sensitive, the starting position must be specified to meet language restrictions. For instance, in the example above, "05" would start in column 12. Also note that the language representation cannot exceed 80 characters. Since the size of a language mnemonic can be upto a maximum of 32 characters, be careful not to insert too many spaces between the various parts of language representation code.

Shown below are some examples of class word defaults:

```
For class word "address":
Class code: text
Data type: alphanumeric
Size: 30
Size type: bytes
Justification: L
Character varying: F
Screen format: x(n)
Report format: x(n)
Default: null
Occurs: 1
COBOL repr code:      05 NAME pic x(SIZE).
PL1 repr code:    5 NAME char(SIZE);
C repr code:char   NAME[SIZE];
SQL repr code:NAME      char(SIZE),
For class word "date":
Class code: date
Data type: binary
Size:
Size type: bytes
Precision: S
Scale: O
Sign: N
Rounded: Y
Screen format: MM/DD/YYYY
Report format: MM/DD/YYYY
Default: null
Occurs: 1
COBOL repr code:      05 NAME comp-2.
PL1 repr code:    5 NAME bin(31);
C repr code:long int NAME;
SQL repr code:NAME      datetime,
```

Abbreviations and mnemonics: When a language specific name is created for a data element from the constituent words as described above, the DED tries to use standard abbreviations wherever possible. If the standard abbreviation is not available, then the first five characters of each word are used.

During the data item validation process, abbreviations that are in a data item are translated to the words in order to compare to the standard data element. However, these items may not necessarily use standard abbreviations. The system will take a non-standard abbreviation, and try to find the corresponding word (or words) for further validation. Therefore, non-standard abbreviations have to be entered as well as standard abbreviations. When entering words, abbreviations, and the Standard indicator, certain constraints are enforced by the system. These constraints are:

1. A word can only have one standard abbreviation;
2. A standard abbreviation can correspond to one word only.

For example, the word "number" may have a standard as well as non-standard abbreviations. When creating a data element with the word number in it, the standard form could be "nbr"; however, if a programmer used the abbreviation "nmbr" or "no", the dictionary will prompt for use of the standard.

Figure 5:
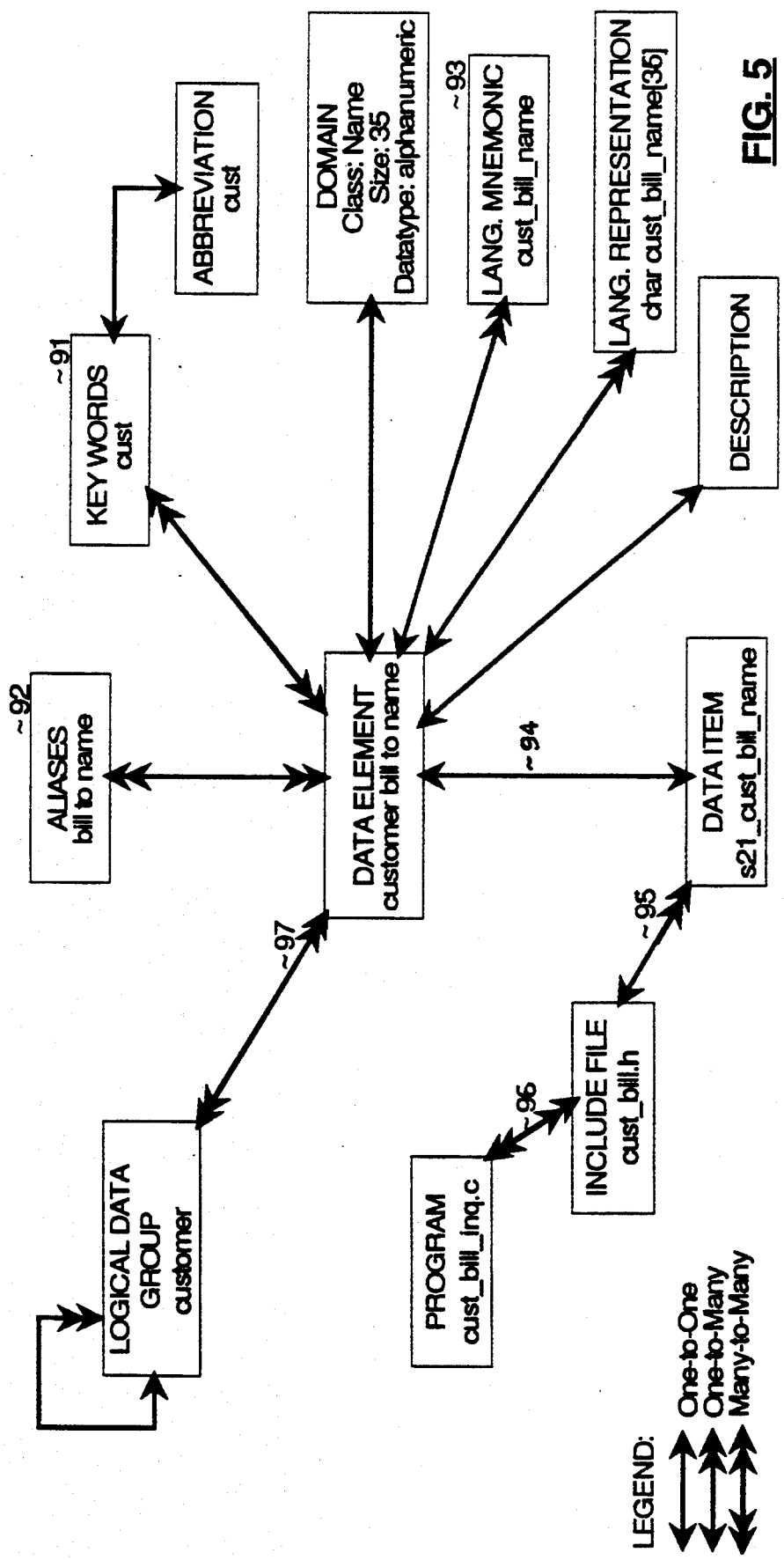
FIG. 5 is a diagram illustrating the inter-relationships between the data element definition and its components, stored in the DED.

The querying capability built into the invention is based on pointers or cross-references that are automatically established when a data element is defined and stored in the DED database 90. These cross-references are shown in further detail in FIG. 5. The cross-references that assist in querying the data element are keywords 91, aliases 92, mnenomics 93, as well as data items 94 in Include Files. A data element's existence in logical data groups is provided by using the cross-reference from logical data group to data element 97 which is established when the data element is created.

The change management function uses the where-used information stored for each data element consisting of the Include Files in which it is used, and programs which access it. To obtain the where-used information the invention uses the cross-references between data element and data item 94, between data item and include File 95, and between Include File and program 96. The "Include File to data item" and "data item to data element" cross-references ate updated at the time of Include File edit, validation, or generation. The program to Include File cross-references are updated at the time of compilation of the program.

The audit process is a key part of the system because it ties it into a measurable framework. The audit is performed by reading the Include File lines that correspond to legal data items to get a count of the total number of data items in the Include File; reading the cross-references in the support file, and performing a comparision against the standard representation to check for the following:

if the data element does not have the standard indicator set to 'S' a warning to that effect is issued;

if neither the data item name or representation matches the data element representation, then the data item is not compliant to the data element standard, with the following exception:

if the grandfather switch is set to 'G' to represent grandfathering, or 'E' to represent an exemption;

and summarizing the data from the cross-references to provide the following statistics:

total number of data items in the Include File; total number of data items validated against the DED; total number of errors; total number of warnings; total number of informationals; dictionary compliance percentage.

The contents of the audit are automatically reported when the pre-processor to the compiler is executed. The following steps are performed by the preprocessor:

All "copy Include File" statements in a program are resolved to the IFD directory pathnames provided by the programmer to the pre-processor the program name is inserted as a cross-reference in each Include File's support file the audit report for each Include File is reported in the compile output; the "copy Include File" statements in the program are replaced with the contents of the Include File the appropriate compiler is invoked in the user's home directory, so that the user does not feel that anything different has occurred other than the addition of the Include File audit report to the compiler output.

The ability to propagate changes throughout the dictionary in a graceful manner is an important aspect of the invention. It is based on the cross-references to Include Files and programs that have been established through the steps discussed above. For example, if a data element definition is changed, its existence in various Include Files and programs can be identified. This is the basis on which the impact of a change can be estimated, and the appropriate decisions made. It may not be practical to change every Include File and program to the latest version of a data element. The invention allows the administrator to grandfather certain occurrences so that the user does not have to change the data item in that Include File and corresponding programs.

Although the present invention is described with respect to the IFD and DED being on different nodes on a network, the invention is equally applicable to a single computer system with multiple processes to support the IFD and DED. The term "Include File" is used in a generic manner to denote a store of data definitions, such term to include other terms for such stores including but not limited to copybook, copylib, and other sources of such information. While the invention has been particularly shown and described with reference to a preferred embodiment thereof, it will be understood by those skilled in the art that various changes in form and details may be made therein without departing from the spirit and scope of the invention.

I claim:

1. In a network of one or more computers having data structures relating to programs, file layouts, and database schema, the data structures being stored in Include Files, wherein each of the data structures comprises one or more data items, each of the Include Files is associated with a Support File, and each of the Include Files is accessible from an Include File Dictionary (IFD) that includes a tree-structured directory for mapping the Include Files to the network and access control information, a method for enabling a user to interactively edit or create Include Files so as to comply with a set of logical data element definitions derived from the data structures and stored in a Data Element Dictionary (DED), the method comprising the steps of:
   1) retrieving a user selected Include File from the IFD into a text editor;
   2) editing or creating data structures of the selected Include File from the text editor;
   3) validating a user selected data item of the data structures against the logical data element definitions in the DED from the text editor, and if valid logical data element definitions for the selected data item exist, performing the steps of:
       displaying logical data element definitions that are valid for the selected data item;
       replacing the selected data item in the text editor with a user selected one of the displayed logical data element definitions;
       storing cross-reference information in a Support file corresponding to the selected Include File, the cross-reference information referencing a logical data element definition in the DED corresponding to the selected data item in the text editor; or
   if valid logical data element definitions for the selected data items do not exist, performing the steps of:
       proposing a logical data element definition by the user, in accordance with a set of rules of defined in the DED, in the DED and subject to approval by a system administrator;
       replacing the selected data item in the text editor with the proposed logical data element definition;
   4) auditing the selected Include File using the support file, including cross-references, and calculating a dictionary compliance percentage to provide a summary of the compliance of the selected Include File to the DED.

2. A method as claimed in claim 1 further comprising the step of making the Include Files and the corresponding Support Files commonly accessible for sharing, controlled modification, and use, using the IFD in which a configuration file references an anchor directory, the anchor directory references a tree-structured data file, the tree-structured data file references one or more subdirectories upto and including a leaf directory, which in turn reference the Include Files and Support Files, the steps comprising:
   selecting one of the computers as the site of the anchor directory;
   creating an anchor directory and one or more subdirectories upto and including the leaf directory under which the Include Files and the corresponding Support Files will be referenced;
   creating a tree-structure data file that will contain directory path names upto and including the leaf directory in which the Include Files and corresponding Support Files are stored;
   assigning links from a leaf directory on the computer with the anchor directory to leaf directories in computers not containing the anchor directory in the network;
   assigning access privileges at different subdirectory levels to users and project managers;
   updating the tree-structure data file when the directory and file structures have changed;
   updating the configuration file to reflect the pathname to the anchor directory of the IFD that the user is working with.

3. A method as claimed in claim 2 further comprising the step of providing screen based commands that mimic the operation and function of operating system commands for creating, copying, moving, renaming, deleting, printing, and displaying Include Files and corresponding Support Files, the screen based commands to utilize the access rights in the IFD tree-structure data file in coexistence with access privileges upon subdirectories and files that may have existed prior to the creation of the IFD.

4. A method as claimed in claim 1 wherein the selected data item is parsed before validating against the logical definitions of the DED and the step of storing cross-reference information further comprises the step of:
   storing additional support information transparently in the Support File, the additional support information including header information including description, type, language, change date, type and reason, and a cross-reference to each program that currently uses the selected Include File.

5. A method as claimed in claim 4 further comprising the steps of:
   5) creating a Support File corresponding to an Include File when the Include File initially created;
   6) updating Support Files in response to screen based commands including copy, rename, delete, and move commands to maintain consistency;
   7) synchronizing, at the end of an edit session, a Support File corresponding to the selected Include File to correspond to a latest version of the selected Include File.

6. A method as claimed in claim 4 wherein the step of retrieving, further comprising the steps of:

creating a temporary copy of the selected Include File and a temporary of the Support File;

moving the temporary copy of the selected Include File into an edit buffer and the temporary copy of the Support File into memory;

invoking the text editor;

invoking a context dispatcher from the text editor in the appropriate context, including edit, validate, and generate;

creating a link to the DED across the network;

testing the DED by a handshake routine to ensure that the DED is available.

7. A method as claimed in claim 4 wherein the parsing and validating steps further comprise the steps of:

parsing a line of the selected Include File containing the selected data item;

isolating a data item name from the parsed line based on the programming language of selected Include File as defined in the Support File;

searching the DED for a data element name of a logical data element definition using the data item name, data element names using cross-references, and data element mnemonic names of logical data element definitions equivalent to the data item name;

storing a cross-reference in the Support File if a data element name corresponding to the data item name exists, the cross-reference referencing a logical data element corresponding to the selected data item;

parsing the data item name into tokens and expanding each of the tokens into a keyword using predetermined cross-references in the DED;

searching the DED for data element names that contain one or more of the keywords;

combining results of the searches to form a list of valid logical data element definitions for display to the user.

8. A method as claimed in claim 1 wherein the step of proposing further comprises the steps of creating, by the user, a short description of upto 10 lines of 40 characters;

specifying, by the user, a name using a naming convention;

specifying, by the user, data types based on domain;

specifying, by the user, language representations based on templates;

expanding default data definition rules where necessary.

9. A method as claimed in claim 8 further expanding default data definition rules, steps comprising:

identifying keywords corresponding to tokens in the data item name, and displaying in the order of the naming convention, viz. prime word, one or more qualifiers, class word, class word modifier;

entering missing keywords corresponding to tokens, supplying prime word and class word, and additional words to complete the name;

for each additional word, entering a standard abbreviation;

for each new prime word, entering a corresponding logical data group, and supplying a description of the logical data group;

for each new class word, entering default characteristics, including language representation rules, data type, screen and report format, value range;

committing the data element definition in the Data Element Dictionary and the data item cross-reference in the Support File.

10. A method as claimed in claim 8 wherein the steps of replacing returns a standard language representation to an edit buffer associated with the selected Include File, and the step of storing cross-reference information simultaneously updates a memory copy of the Support File with cross-reference information referencing the selected data item with a corresponding data element name, version number, and standard indicator from the DED.

11. A method as claimed in claim 5 further synchronizing the Include File and the Support File at the end of the edit session, the steps comprising:

updating changes to the Support File header fields that were made by the user, from a memory copy to a temporary copy to a permanent copy of the Support File;

deleting data element cross-references in the memory copy of the Support File for which there is no corresponding data item in the Include File;

updating changes to the data element cross-references that were made by the user, from the memory copy to the temporary copy to the permanent copy of the Support File.

12. A method as claimed in claim 1 wherein the step of auditing compares a representation of data items in the selected Include File with a representation of a corresponding logical data element definition in the DED by utilizing the cross-references in the Support File, the steps comprising:

reading the selected Include File lines that correspond to legal data items to get a count of a total number of data items in the selected Include File;

for each line containing a data item in the selected Include File, reading the cross-references in the Support File and locating a cross-reference corresponding to the data item in each line;

reading the data item's representation in the Support File, and performing a comparison against a representation of a corresponding data element in the DED to check for the following:

if the data element does not have a standard indicator set to 'S' a warning is issued;

if neither the name of the data item or representation matches the name of the data element or the data elements representation, then the data item is not compliant to the data element, with the following exception:

if a grandfather switch is set to 'G' to represent grandfathering, or 'E' to represent an exemption;

summarizing data from the cross-references to provide the dictionary compliance percentage, by dividing the count of the total number of data items in the Include File by the count of the number of the data items compliant to the data element standard.

13. A method as claimed in claim 5 of updating cross-references between programs and the Include Files, the steps comprising:

invoking a pre-processor to a compiler;

specifying IFD anchor directory for the searching for Include Files;

updating the Support File corresponding to each Include File referenced in each program by adding a cross-reference to each program.

* * * * *